John Maclure, Harness Pad.

PATENTED DEC 24 1867

No. 72514

Witnesses
Theo Tinsche
W. Erwin

Inventor
John Maclure
Per
Attorneys

United States Patent Office.

JOHN MACLURE, OF NEWARK, NEW JERSEY.

Letters Patent No. 72,514, dated December 24, 1867.

IMPROVEMENT IN HARNESS-PADS.

*The Schedule referred to in these Letters Patent and making part of the same.*

TO ALL WHOM IT MAY CONCERN:

Be it known that I, JOHN MACLURE, of Newark, in the county of Essex, and State of New Jersey, have invented a new and useful Improvement in Harness-Pads; and I do hereby declare that the following is a full, clear, and exact description thereof, which will enable those skilled in the art to make and use the same, reference being had to the accompanying drawings, forming part of this specification.

The object of this invention is to so construct a pad-plate for a harness-pad that the mountings or trimmings can be easily changed, and without destroying or in anywise impairing the beauty or utility of the pad, and also so that the cheapest as well as the most expensive kinds of pads may be made on the plate, all of which work shall require no very skilled workman to execute.

Similar letters of reference indicate corresponding parts.

Figure 1:
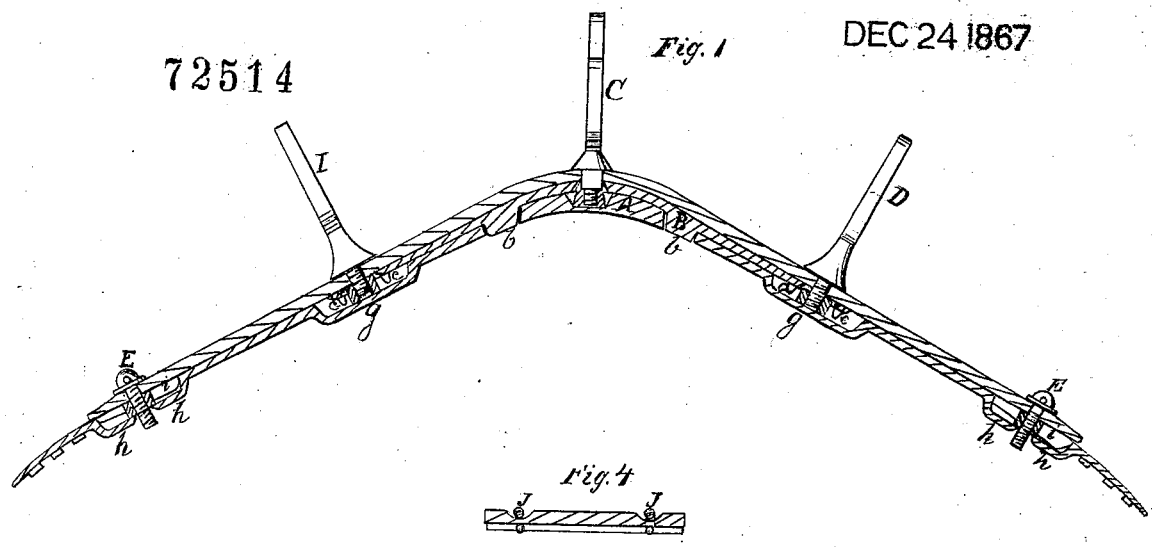
Figure 1 is a longitudinal section of the pad-plate complete, with the outside leather, post-hook, trimming-bolts, and terrets attached, the arrangement being according to my invention.
Figure 2:
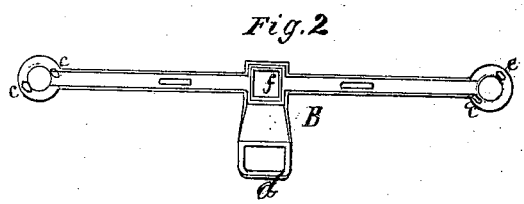
Figure 2 is a sub-plate, forming a part of the main pad-plate, as will be hereafter described.

The pad-plate is formed of two parts, the sub-plate being secured in a recess in the main plate, as seen in the drawing, and held partially by lugs $b$. A represents the main plate, seen in fig. 1 in blue. B is the sub-plate, which lies in a recess, with lugs on its under side, which pass through the main plate, as seen at $b\ b$, fig. 1. There are also other lugs near the ends of this plate, which act as stops to the terret-nuts, as seen at $c\ c$, figs. 1 and 3. C is the post-hook. D represents the terrets. E represents the finishing-bolts. The nuts of the post-hook, terrets, and finishing-bolts are seen in fig. 1 in yellow. The sub-plate has the crupper-loop $d$ attached to it, and it has through it a square orifice, $f$, through which the post-hook passes, as seen in the drawing. The screws of the terrets also pass through the sub-plate, where the nuts are supported by the loops $g\ g$ on the main plate, and which nuts are prevented from turning round, when the terret is screwed in, by the lugs C. The finishing-bolts E are secured to the main plate by rectangular-shaped nuts, which are supported by projecting lips $h\ h$. These nuts are drawn up by the screw on to tapering flanges $i\ i$, the taper of which is reversed, so that, as the nut turns, its ends are drawn on to the edges of the tapering flanges, or on to two inclined planes, the inclines of which are in opposite directions, so that the farther the nut turns the tighter it is fastened.

The ends of the main plate are perforated by slots, instead of round holes, and with a channel or groove, J, on the upper sides, for the protection of the thread, as seen in the cross-section, Figure 4, on line $x\ x$.

Figure 3:
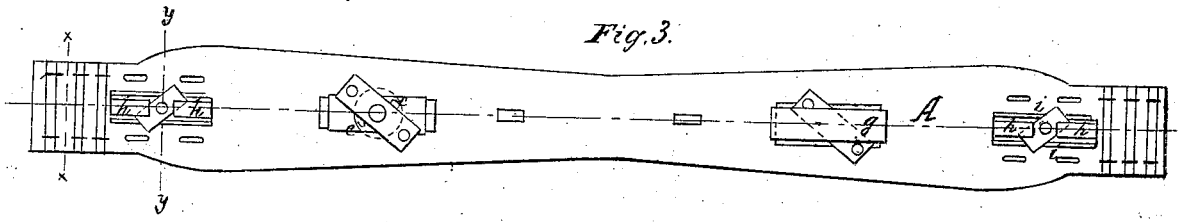
Figure 3 is a bottom view of the pad-plate.
Figure 5:
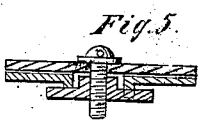

Figure 5 is a cross-section through the line $y\ y$ of fig. 3.

It will be seen that a pad-plate formed in this manner allows of the trimmings being changed with the greatest facility without injuring or marring the pad in any manner.

Having thus described my invention, I claim as new, and desire to secure by Letters Patent—

1. The main plate A, constructed substantially as shown and described, for the purposes set forth.
2. The sub-plate B, in combination with the plate A, substantially as and for the purposes described.
3. The lugs $b$ and $c$, on the sub-plate B, substantially as and for the purposes described.
4. The double-inclined planes $i$, the slot-holes and grooves J, on the main plate A, substantially as described and for the purposes set forth.

JOHN MACLURE.

Witnesses:
   WM. F. MCNAMARA,
   ALEX. F. ROBERTS.